United States Patent
Amasaka et al.

(10) Patent No.: US 12,068,956 B2
(45) Date of Patent: Aug. 20, 2024

(54) COMMUNICATION APPARATUS, RECEIVING SIDE COMMUNICATION APPARATUS, COMMUNICATION METHOD AND PROGRAM

(71) Applicant: NIPPON TELEGRAPH AND TELEPHONE CORPORATION, Tokyo (JP)

(72) Inventors: Mitsuo Amasaka, Musashino (JP); Tomohiro Okada, Musashino (JP); Shunsuke Homma, Musashino (JP); Takayuki Nakamura, Musashino (JP); Takuya Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 22 days.

(21) Appl. No.: 17/759,871

(22) PCT Filed: Feb. 25, 2020

(86) PCT No.: PCT/JP2020/007460
§ 371 (c)(1),
(2) Date: Aug. 1, 2022

(87) PCT Pub. No.: WO2021/171364
PCT Pub. Date: Sep. 2, 2021

(65) Prior Publication Data
US 2023/0119073 A1    Apr. 20, 2023

(51) Int. Cl.
*G06F 15/173*    (2006.01)
*H04L 45/00*    (2022.01)
(Continued)

(52) U.S. Cl.
CPC ............. *H04L 45/74* (2013.01); *H04L 45/42* (2013.01); *H04L 45/566* (2013.01)

(58) Field of Classification Search
CPC ........ H04L 45/74; H04L 45/42; H04L 45/566
(Continued)

(56) References Cited

U.S. PATENT DOCUMENTS

| | | | | |
|---|---|---|---|---|
| 2002/0194367 | A1* | 12/2002 | Nakamura | .......... H04L 12/2898 709/238 |
| 2009/0190518 | A1* | 7/2009 | Kim | ...................... H04L 12/189 370/312 |

(Continued)

FOREIGN PATENT DOCUMENTS

| | | |
|---|---|---|
| JP | 2011-147025 | 7/2011 |
| JP | 2019-017004 | 1/2019 |

(Continued)

OTHER PUBLICATIONS

The multicast service model for Next Generation Internet based on Identifier/Locator Separation Jianfeng Guan; Wei Quan; Changqiao Xu; Huachun Zhou; Hongke Zhang 2012 IEEE Globecom Workshops Year: 2012 | Conference Paper | Publisher: IEEE (Year: 2012).*

(Continued)

*Primary Examiner* — Yves Dalencourt
(74) *Attorney, Agent, or Firm* — IPUSA, PLLC

(57) ABSTRACT

A communication device includes a storage unit that stores a conversion table; a receiving unit that receives a packet addressed to a user terminal from a server, and an address conversion unit that converts a destination address of the packet into a multicast address in accordance with the conversion table, adds, to the packet, an identification ID for identifying a group to which the user terminal belongs, and transmits the packet to which the identification ID is added.

7 Claims, 16 Drawing Sheets

(51) Int. Cl.
*H04L 45/42* (2022.01)
*H04L 45/74* (2022.01)

(58) Field of Classification Search
USPC .......................................................... 709/238
See application file for complete search history.

(56) References Cited

U.S. PATENT DOCUMENTS

| | | | |
|---|---|---|---|
| 2019/0158638 A1* | 5/2019 | Yanai | H04L 69/22 |
| 2019/0230034 A1* | 7/2019 | Indiresan | H04L 45/74 |
| 2019/0268266 A1* | 8/2019 | Mathison | H04L 45/74 |
| 2020/0177461 A1* | 6/2020 | Zhu | G06F 15/16 |
| 2020/0366604 A1* | 11/2020 | Banerjee | H04L 45/64 |

FOREIGN PATENT DOCUMENTS

| | | | |
|---|---|---|---|
| JP | 2019-075741 | 5/2019 | |
| WO | WO-2016155896 A1 * | 10/2016 | H04L 63/0428 |

OTHER PUBLICATIONS

The multicast service model for Next Generation Internet based on Identifier/Locator Separation Jianfeng Guan; Wei Quan; Changqiao Xu; Huachun Zhou; Hongke Zhang 2012 IEEE Globecom Workshops Year: 2012 | Conference Paper | Publisher: (Year: 2012).*
Shunsuke Homma et al., "Gateway Function for Network Slicing draft-homma-rtgwg-slice-gateway-01", rtgwg Internet-Draft Intended status: Informational, Nov. 3, 2019, https://tools.ietf.org/html/draft-homma-rtgwg-slice-gateway-01.

* cited by examiner

Fig. 3

| DESTINATION IP | MC ADDRESS | IDENTIFICATION ID |
|---|---|---|
| F | 224.1.1.1 | 21 |
| H | 224.1.1.1 | 21 |
| I | 224.1.1.1 | 21 |
| D | 224.1.1.1 | 22 |
| E | 224.1.1.1 | 22 |
| G | 224.1.1.1 | 22 |

Fig. 4

| MC ADDRESS | IDENTIFICATION ID | DESTINATION IP |
|---|---|---|
| 224.1.1.1 | 21 | F |
| 224.1.1.1 | 22 | D |
| 224.1.1.1 | 22 | E |
|  |  |  |

Fig. 10

| CONTENT | DESTINATION IP | DESTINATION PORT |
|---|---|---|
| OPERATION DATA TO ROOM (1) | 103.1.1.1 | 50001 |
| OPERATION DATA TO ROOM (2) | 103.1.1.1 | 50002 |

Fig. 11

| USER IP | CONTENT |
|---|---|
| D | ROOM (2) |
| E | ROOM (2) |
| F | ROOM (1) |
| G | ROOM (2) |
| H | ROOM (1) |
| I | ROOM (1) |
|  |  |

Fig. 12

| DESTINATION PORT | MC ADDRESS | IDENTIFICATION ID |
|---|---|---|
| 50001 | 224.1.1.1 | 21 |
| 50002 | 224.1.1.1 | 22 |

Fig. 13

| MC ADDRESS | IDENTIFICATION ID | DESTINATION IP |
|---|---|---|
| 224.1.1.1 | 21 | H |
| 224.1.1.1 | 21 | I |
| 224.1.1.1 | 22 | G |
|  |  |  |

COMMUNICATION APPARATUS, RECEIVING SIDE COMMUNICATION APPARATUS, COMMUNICATION METHOD AND PROGRAM

TECHNICAL FIELD

The present disclosure relates to a technique for distributing contents of videos, games, or the like, to a plurality of user terminals.

BACKGROUND ART

A relay traffic amount in a network tends to increase as the distribution of contents of videos or the like increases.

Applications such as games that simultaneously distribute the content to a large number of unspecified user terminals are also increased. In such games, it is common for the content to be changed in any group of users and the group is changed in a short period of time.

CITATION LIST

Non Patent Literature

NPL 1: IETF "Gateway Function for Network Slicing draft-homma-rtgwg-slice-gateway-01" https://tools.ietf.org/html/draft-homma-rtgwg-slice-gateway-01

Patent Literature

PTL 1: JP 2019-75741.

SUMMARY OF THE INVENTION

Technical Problem

As with the above games, in the application that simultaneously distributes the content to a large number of unspecified user terminals, packet transfer by an existing unicast or multicast scheme increases a processing load or a management load, making the efficient packet transfer difficult.

In view of the foregoing, an object of the present disclosure is to provide a technique for enabling the efficient packet transfer in the application that simultaneously distributes the content to a large number of unspecified user terminals.

Means for Solving the Problem

According to the disclosed techniques, a communication device includes a storage unit that stores a conversion table, a receiving unit that receives a packet addressed to a user terminal from a server, and an address conversion unit that converts a destination address of the packet into a multicast address in accordance with the conversion table, adds, to the packet, an identification ID for identifying a group to which the user terminal belongs, and transmits the packet to which the identification ID is added.

Effects of the Invention

According to the disclosed techniques, the technique for enabling the efficient packet transfer can be provided in the application that simultaneously distributes the content to a large number of unspecified user terminals.

BRIEF DESCRIPTION OF DRAWINGS

FIG. 3 is a diagram illustrating a conversion table in an SLG (sender).
FIG. 4 is a diagram illustrating a redistribution table at an SLG (receiver).
FIG. 10 is a diagram illustrating a distribution table in a controller.
FIG. 11 is a diagram illustrating a user table in the controller.
FIG. 12 is a diagram illustrating a conversion table in the SLG (sender).
FIG. 13 is a diagram illustrating a redistribution table in the SLG (receiver).

DESCRIPTION OF EMBODIMENTS

Hereinafter, an embodiment of the present disclosure (the present embodiment) will be described with reference to the drawings. The embodiments to be described below are merely exemplary, and an embodiment to which the present disclosure is applied is not limited to the following embodiments.

For example, in the embodiments described below, a game is cited as an example of an application that simultaneously distributes the content to a large number of unspecified user terminals, and this is merely an example. The present disclosure is applicable to a variety of content distribution that is not limited to the game. In the following, a "room" is used as an example of a group to which the user terminal belongs, but the group to which the user terminal belongs is not limited to the "room".

while a network slicing technique is used in the embodiment, it is not necessary to use the network slicing technique, but the present disclosure may be implemented with no use of the network slicing technique.

Overview of Embodiments

In the embodiment, it is assumed that a system that distributes the content from a game server 10 as illustrated in FIG.

Figure 1:
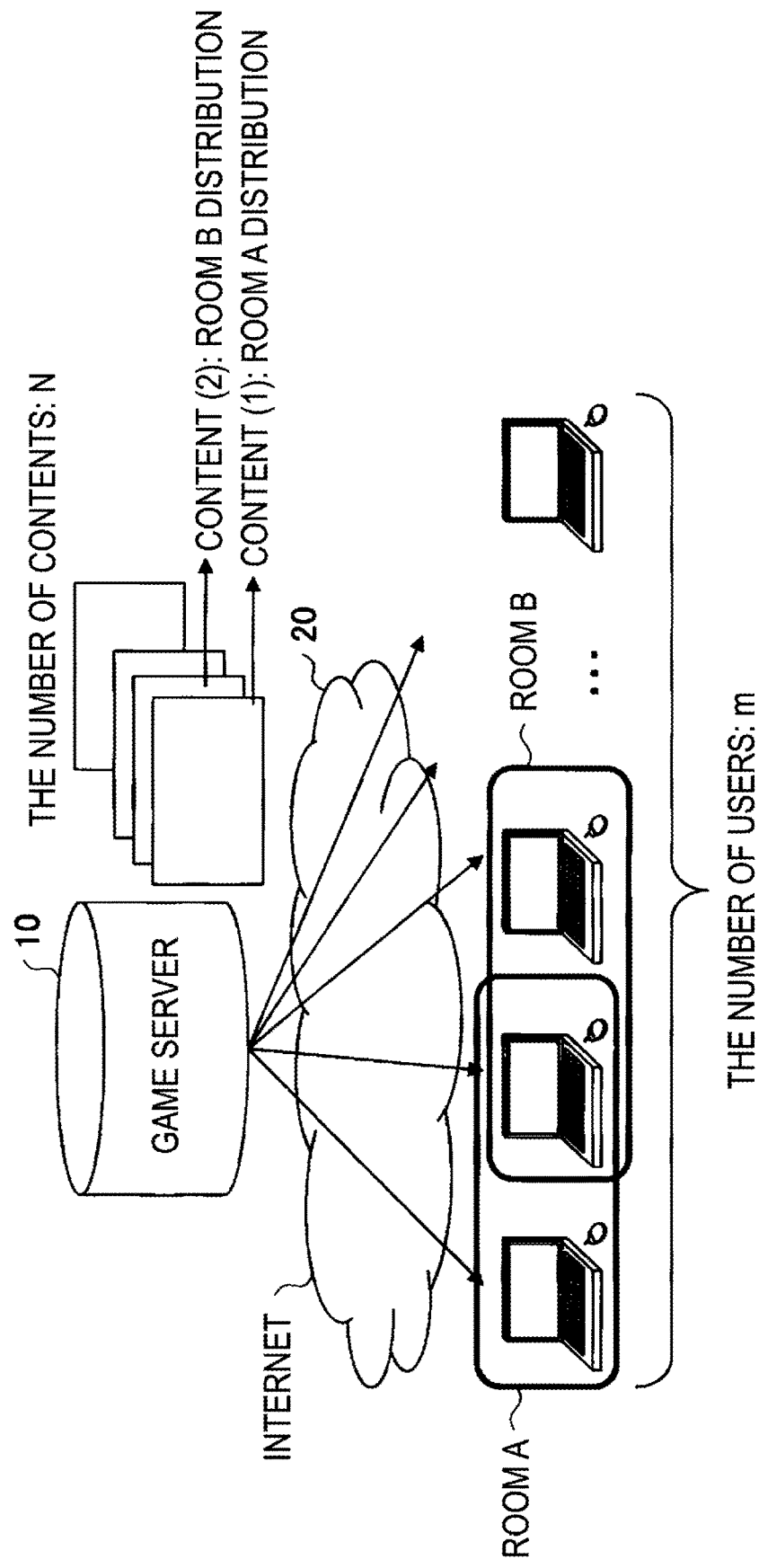
FIG. 1 is a diagram illustrating an overview according to an embodiment of the present disclosure.

1. In the system of FIG. 1, the content is simultaneously distributed from the game server 10 to a number of unidentified user terminals through the Internet 20. The plurality of user terminals joining a "room A" and the plurality of user terminals joining a "room B" are illustrated in the example of FIG. 1.

In the example of FIG. 1, a content (1) is distributed from the game server 10 to the user terminal belonging to the room A, and a content (2) is distributed from the game server 10 to the user terminal belonging to the room B. The content is frequently changed in any group, and also the group is frequently changed.

An existing technique for the packet transfer in gaming content distribution as described above is a unicast scheme, a multicast scheme, and a traffic conversion scheme described in PTL 1.

In the unicast scheme, the load increases at a relay device and a distribution server because the target data is distributed in the unicast scheme to all user terminals. Furthermore, arrival time of the packet is different for each user terminal because the packet is transmitted in order for each user terminal.

In the multicast scheme, in order that an individual multicast address is set for each produced group to perform data distribution, a multicast correspondence is required for all terminals and servers, and management of a vast multicast address is required.

In the traffic conversion scheme, a network side converts the packet distributed in unicast to a multicast packet. However, the traffic conversion scheme requires the application of identification information corresponding to the previously-converted multicast address.

In the embodiment, an architecture that deploys a slice gateway (hereinafter, referred to as SLG) at the connection point between domains is adopted to convert the unicast packet and the multicast address in the SLG at both ends of the domain. In this way, the embodiment solves the problem of existing schemes and allows for efficient packet transfer.

Example 1 and Example 2 will be described below as a configuration and operation example of a specific system according to the embodiment.

Example 1

Figure 2:
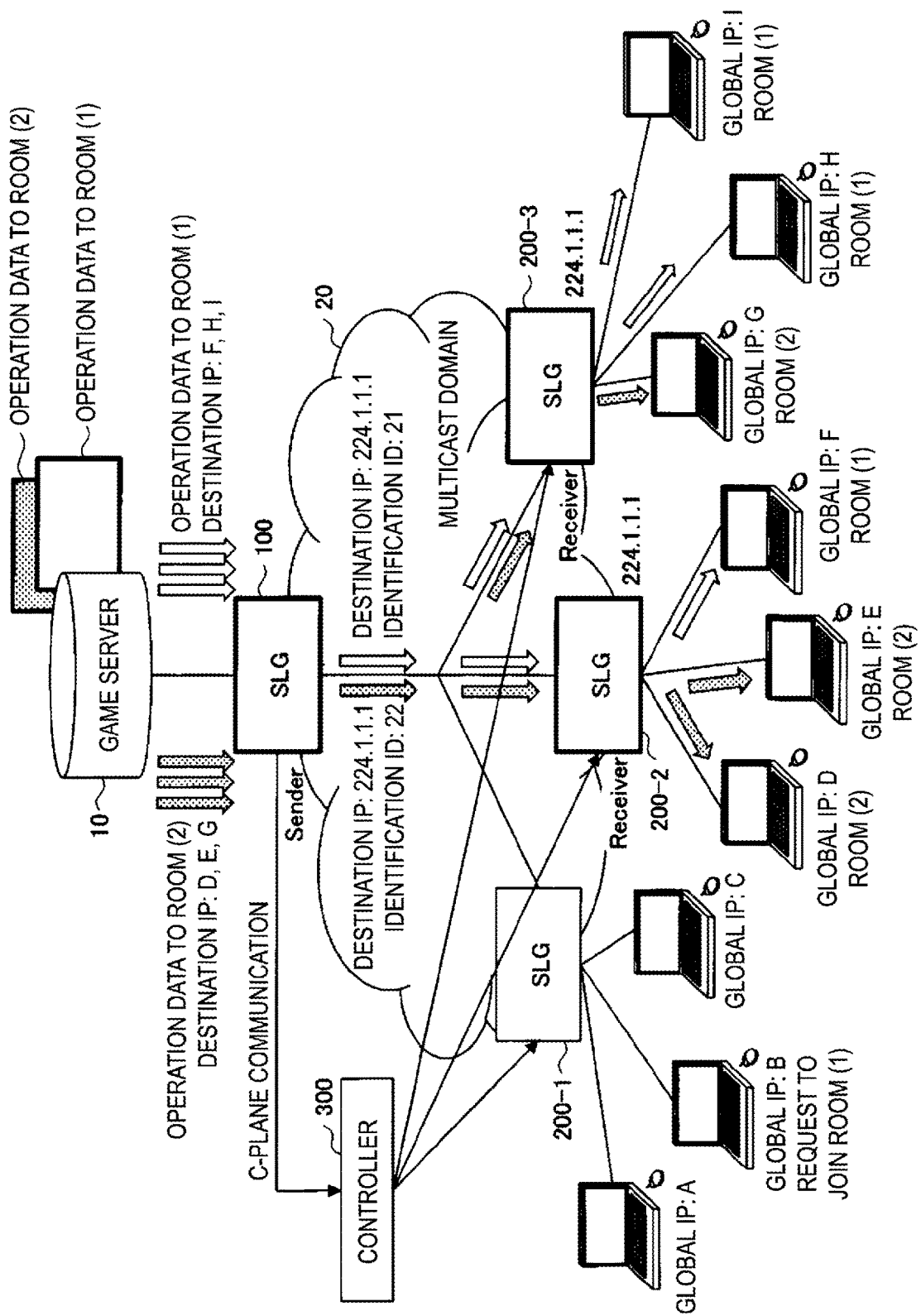
FIG. 2 is a diagram illustrating a configuration and an operation of a system according to Example 1.

Overall Configuration
FIG. 2 is a diagram illustrating the configuration and the operation of a system according to Example 1. As illustrated in FIG. 2, the system includes a game server 10, a transmission-side SLG (sender) 100, reception-side SLGs (receivers) 200-1 to 200-3, and a controller 300, and communication can be conducted between the devices through a communication network such as the Internet 20.

The SLGs (receivers) 200-1 to 200-3 are also connected to the plurality of user terminals that utilize service provided by the game server 10. A global IP address is allocated to each user terminal as illustrated in the drawing. In the drawings, for convenience of illustration, the global IP address is described as "global IP", and the destination IP address is described as "destination IP".

In Example 1, the game server 10 typically transmits the packet in unicast to each user terminal. Each SLG belongs to a multicast domain, and corresponds to a multicast protocol, and SLGs are a sender and a receiver in the multicast scheme. For the packet transfer between the SLGs, tunneling (for example, VXLAN) is performed using an identification ID such as VLANID.

The SLG (sender) 100 converts a unicast packet received from the game server 10 into a multicast packet based on a conversion table and sends the multicast packet to the SLG (receiver) 200 using the tunneling. The SLG (receiver) 200 converts the multicast packet into the unicast packet based on the redistribution table and transmits the unicast packet to the destination user terminal.

FIG. 3 illustrates a conversion table retained by the SLG (sender) 100. As illustrated in FIG. 3, the conversion table is a table in which the destination IP address, the multicast address (MC address), and the identification ID are associated with each other. The identification ID corresponds to the room (group) in which the user terminal of the destination IP address joins. FIG. 3 illustrates that the identification ID=21 is added to the data in the room (1) and the identification ID=22 is added to the data in the room (2).

FIG. 4 illustrates an example of the redistribution table retained by the SLG (receiver) 200-2. As illustrated in FIG. 4, the redistribution table is a table in which the multicast address, the identification ID, and the destination IP address are associated with each other.

Operation Example
An example of the overall operation of Example 1 will be described with reference to FIG. 2. As illustrated in FIG. 2, the game server 10 transmits packets of operation data in the room (2) addressed to the user terminal (destination IP address: D, E, G) joining the room (2) by unicast, and transmits, in unicast, packets of operation data in the room (1) addressed to the user terminal (destination IP address: F, H, I) joining the room (1).

The SLG (sender) 100 that receives the packets transmitted from the game server 10 temporarily pools the packets (to be held in the buffer) in individual data (in individual room). The SLG (sender) 100 refers to a conversion table in FIG. 3 to convert the destination address of the packet into the multicast address corresponding to the destination IP address of the packet, adds the identification ID corresponding to the destination IP address of the packet to the packet, and transmits the packet to which the identification ID is added. In the embodiments (Example 1 and Example 2), the identification ID may be added to an outside of "the packet having the multicast address as the destination address" or may be added to the inside of "the packet having the multicast address as the destination address".

Within the network 20 (multicast domain), the packet is transferred according to a normal multicast routing protocol.

The SLG (receiver) 200-2 will be described by way of an example with respect to the operation of the reception-side SLG.

When receiving the packet transmitted in the multicast, the SLG (receiver) 200-2 acquires the destination IP address from the redistribution table (FIG. 4) based on the destination IP address (multicast address) of the packet and the identification ID, converts the destination of the received packet from the multicast address into the destination IP address, and transmits the converted packet.

For example, when the packet that is "the multicast address=224.1.1.1 and the identification ID=21" is received, the SLG (receiver) 200-2 transmits the packet to the user terminal of the destination IP address=F by referring to the redistribution table.

The operation in the case that the user terminal (described as "user terminal B") of the global IP address=B newly joins the room (1).

First, the user terminal B transmits a request to join the room (1) with respect to the game server 10. The joining request is distributed to the game server 10 through the network 20 in a normal routing.

In addition to the destination that already transmits the operation data, the game server 10 that receives the joining request transmits the packet of the operation data in the room (1) to the user terminal B in unicast.

The SLG (sender) 100 that receives a packet addressed to the user terminal B acquires the destination IP address (=B) of the packet, detects that the data in the packet is the operation data of the room (1), and determines that the identification ID of the room (1)=21 is allocated to the user terminal B (destination IP address=B).

The SLG (sender) 100 adds "destination IP address=b, MC address=224.1.1.1, identification ID=21" to the conversion table, and transmits a registration request for the user terminal B (destination IP address=B) by C-plane communication to the controller 300. For example, the registration request includes information indicating that a request is made to register "the MC address=224.1.1.1, the identification ID=21, the destination IP address=B" to the receiving-side SLG.

The controller 300 that receives the registration request requires to register "the MC address=224.1.1.1, the identification ID=21, the destination IP address=B" to the SLG (receiver) 200-1 to which the user terminal B is connected.

The SLG (receiver) 200-1 registers the information to the redistribution table, and newly joins the multicast domain when the SLG (receiver) 200-1 does not join in the multicast domain. Specifically, the SLG (receiver) 200-1 transmits the joining request (join) to the multicast domain similarly to the case that the usual terminal joins in the multicast domain. Thus, the data in the room (1) is also distributed to the user terminal B.

Comparison of Example 1 to Other Schemes

Relay traffic can be reduced by the scheme of Example 1 when the scheme of Example 1 is compared to the unicast scheme. Delay to each user is unified because the packet is replicated in the NW.

When the scheme of Example 1 is compared to the multicast scheme, the scheme of Example 1 eliminates the necessity for corresponding to the multicast address of the server and terminal and can be implemented by the single multicast address.

When the scheme of Example 1 is compared to the traffic conversion scheme, the scheme of Example 1 eliminates the necessity for negotiation of the previously identification information about the server content and adding the identification information to the packet by the server.

Device Configuration Example

Examples of functional configurations of the SLG (sender) 100, the SLG (receiver) 200, and the controller 300 in Example 1 will be described below. In the following description of the device configurations, the interface is referred to as "IF".

Figure 5:
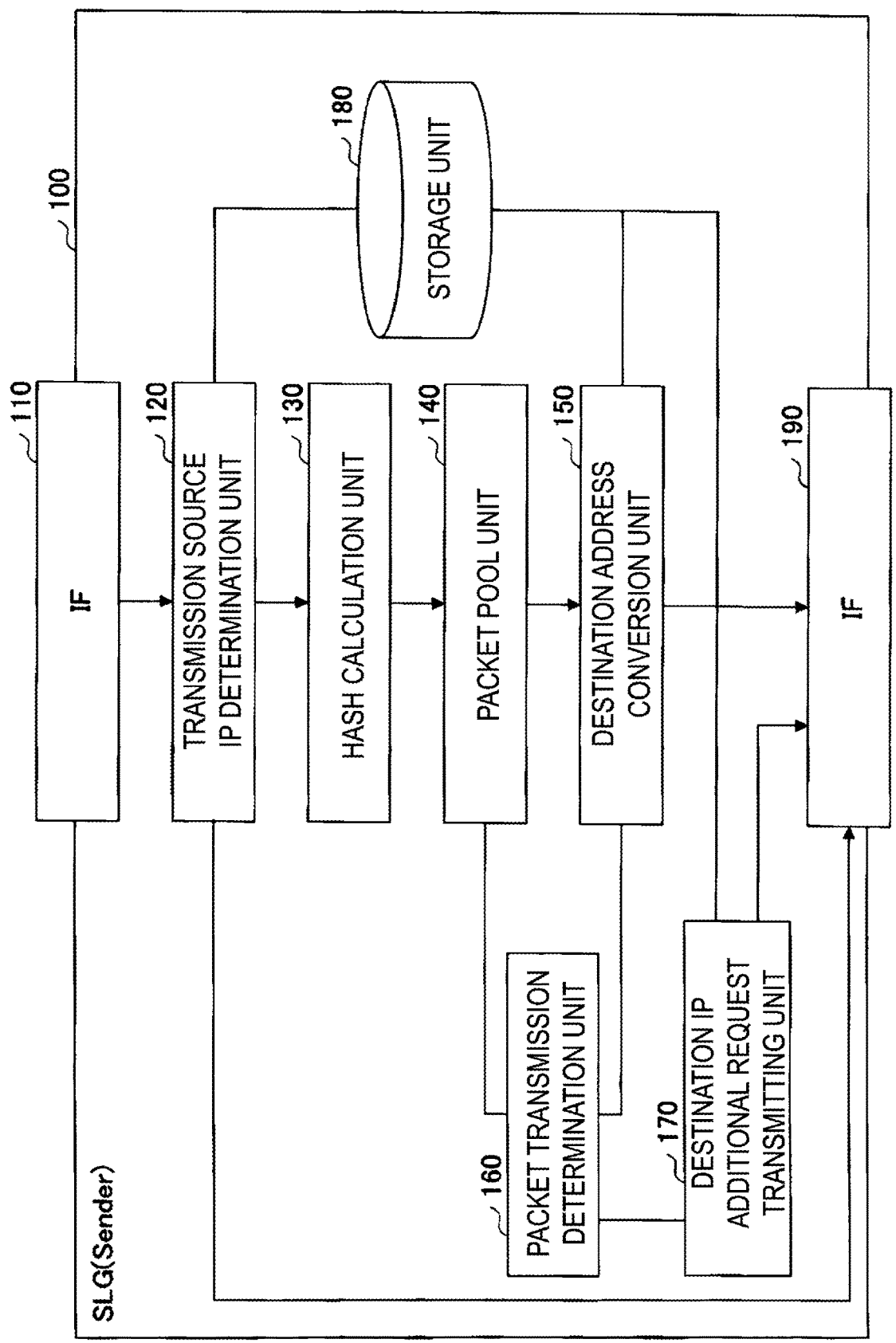
FIG. 5 is a functional configuration diagram of the SLG (sender).

FIG. 5 is a diagram illustrating the example of the functional configuration of the SLG (sender) 100. As illustrated in FIG. 5, the SLG (sender) 100 includes an IF 110, a transmission source IP determination unit 120, a hash calculation unit 130, a packet pool unit 140, a destination address conversion unit 150, a packet transmission determination unit 160, a destination IP additional request transmitting unit 170, a storage unit 180, and an IF 190.

The IF 110 receives the packet from the game server 10 or the like. The transmission source IP determination unit 120 determines whether the source IP address of the received packet is previously-registered.

The hash calculation unit 130 calculates a hash value from a payload value of the received packet. The packet pool unit 140 temporarily stores the packet for each hash value. For example, the packet having the hash value=ABCD is stored in a pool 1 and the packet having the hash values=EFGH is stored in a pool 2.

The packet transmission determination unit 160 performs a determination of the packet transformation, transmission, or the like from a status of the packet pool unit 140. The example of the determination method will be described later. The destination address conversion unit 150 converts the destination of the packet into the multicast address, adds the identification ID, and passes the identification ID to the IF 190. The IF 190 transmits the packet. The destination address conversion unit 150 and the IF 190 may be referred to as an address conversion unit.

The destination IP additional request transmitting unit 170 performs the registration request with respect to the destination not stored in the conversion table (the user terminal newly joining the group) to the controller 300. The storage unit 180 stores a conversion table. The destination IP additional request transmitting unit 170 may be referred to as a transmitting unit.

Figure 6:
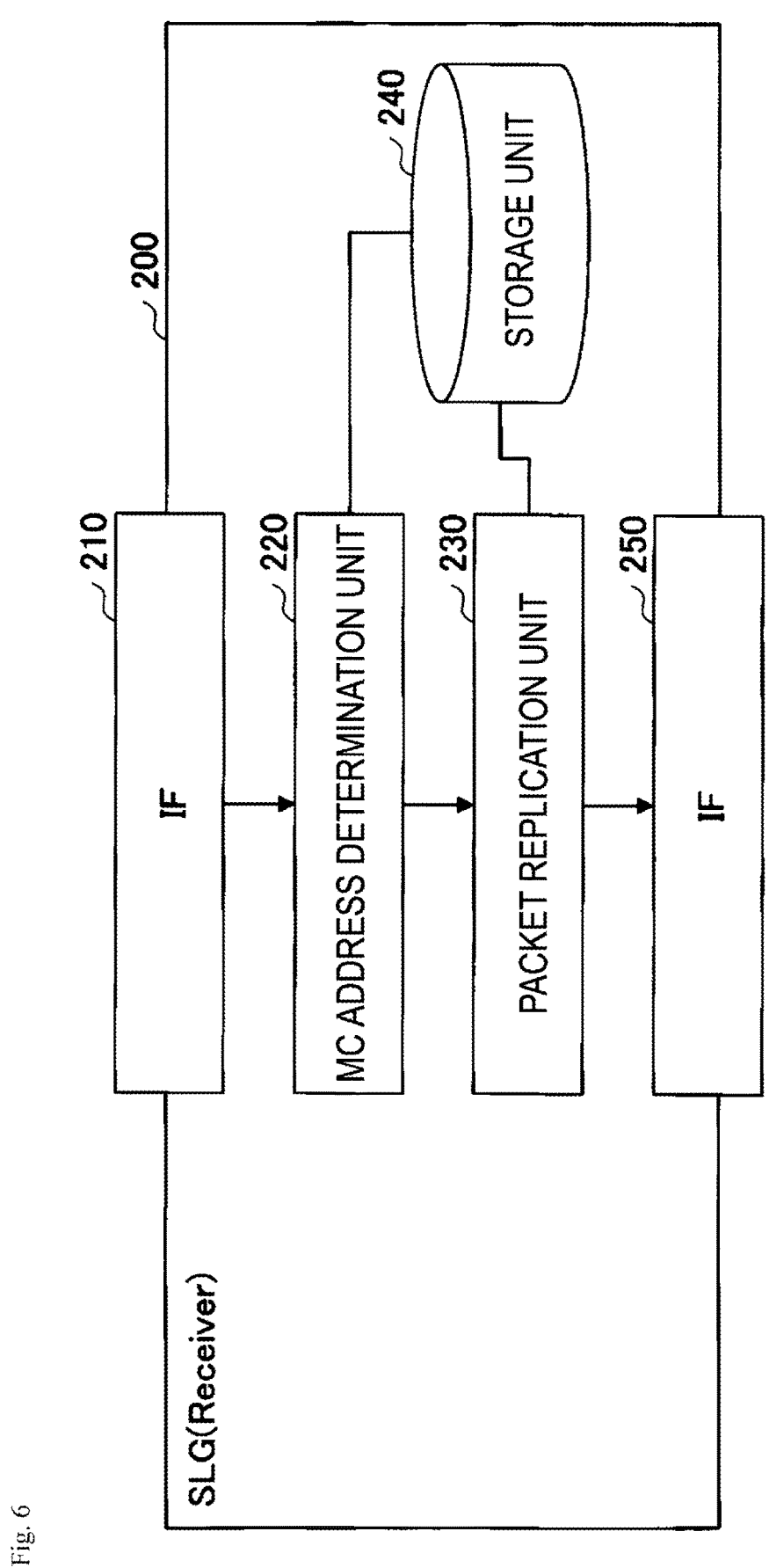
FIG. 6 is a functional configuration diagram of the SLG (receiver).

FIG. 6 is a diagram illustrating an example of the functional configuration of the SLG (receiver) 200. As illustrated in FIG. 6, the SLG (receiver) 200 includes an IF 210, a MC address determination unit 220, a packet replication unit 230, a storage unit 240, and an IF 250.

The IF 210 receives the packet. The storage unit 240 stores the redistribution table. The MC address determination unit 220 determines whether the destination address of the received packet is the address to be converted based on the destination address and the identification ID of the received packet based on the redistribution table. Based on the redistribution table, the packet replication unit 230 replicates the necessary packets with respect to the packet having the address to be converted, converts the destination IP address of each packet from the multicast address to the corresponding destination IP address, and transmits the destination IP address to the IF 250. The IF 250 transmits the packet. The packet replication unit 230 and the IF 250 may be referred to as a transmitting unit.

For example, when the SLG (receiver) 200-2 having the redistribution table in FIG. 4 receives the packet to which the MC address=224.1.1.1 and the identification ID=22 are added, the packet replication unit 230 copies the packet into two packets, converts the destination IP addresses to D, E, and transmits D, E.

Figure 7:
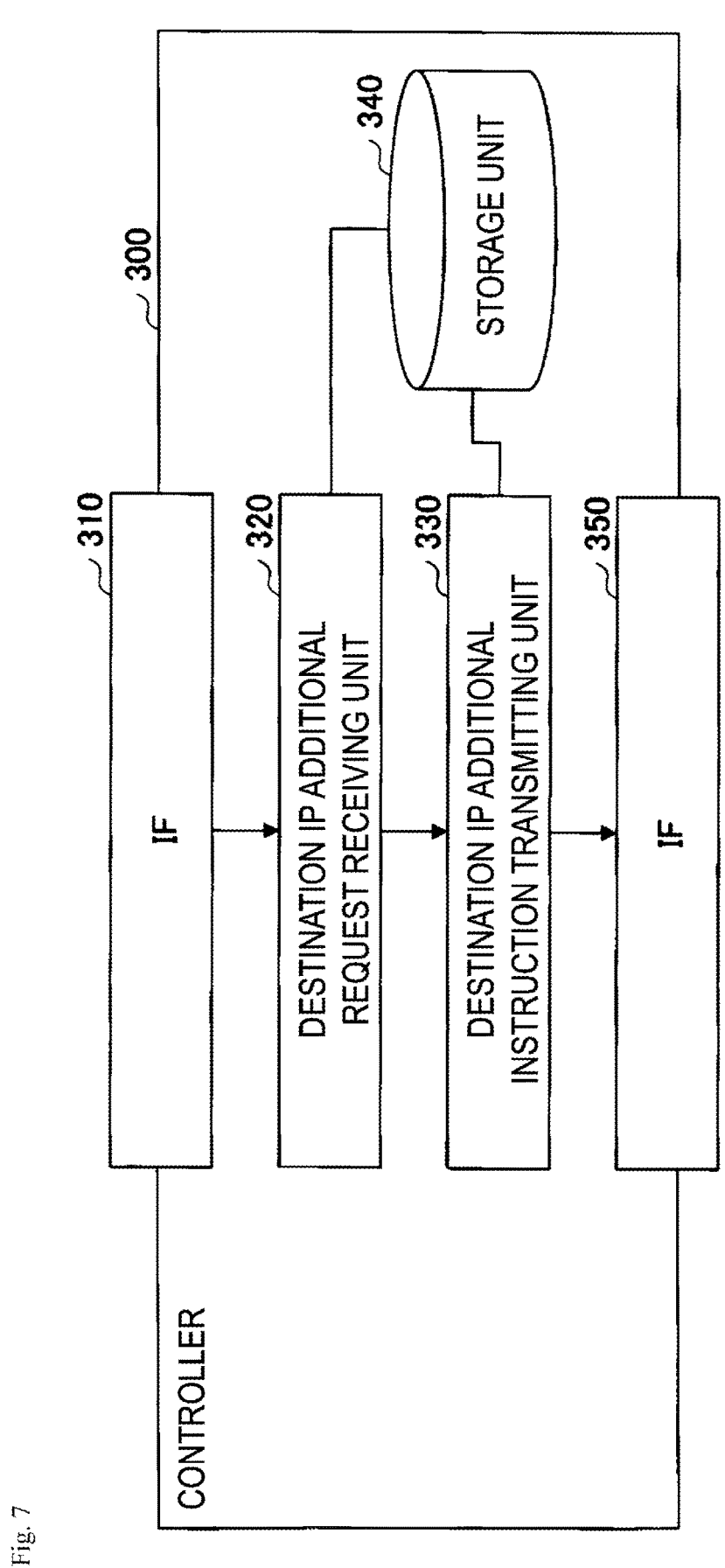
FIG. 7 is a functional configuration diagram of a controller.

FIG. 7 is a diagram illustrating an example of a functional configuration of the controller 300. As illustrated in FIG. 7, the controller 300 includes an IF 310, a destination IP additional request receiving unit 320, a destination IP additional instruction transmitting unit 330, a storage unit 340, and an IF 350.

The IF 310 receives the packet. The destination IP additional request receiving unit 320 receives the destination IP additional request from the destination IP additional request transmitting unit 170 of the SLG (sender) 100 through the IF 310. The storage unit 340 stores the IP address information of each SLG, the IP address information about the user terminal connected to a subordinate of each SLG, and the like.

The destination IP additional instruction transmitting unit 330 refers to the storage unit 340 to check the IP address of the destination SLG (receiver) 299 to which the address addition request is transmitted and transmits the address addition request through the IF 350. The IF 350 transmits the packet. The destination IP additional instruction transmitting unit 330 and the IF 350 may be referred to as a transmitting unit.

Operation Flow of SLG (Sender) 100

Figure 8:
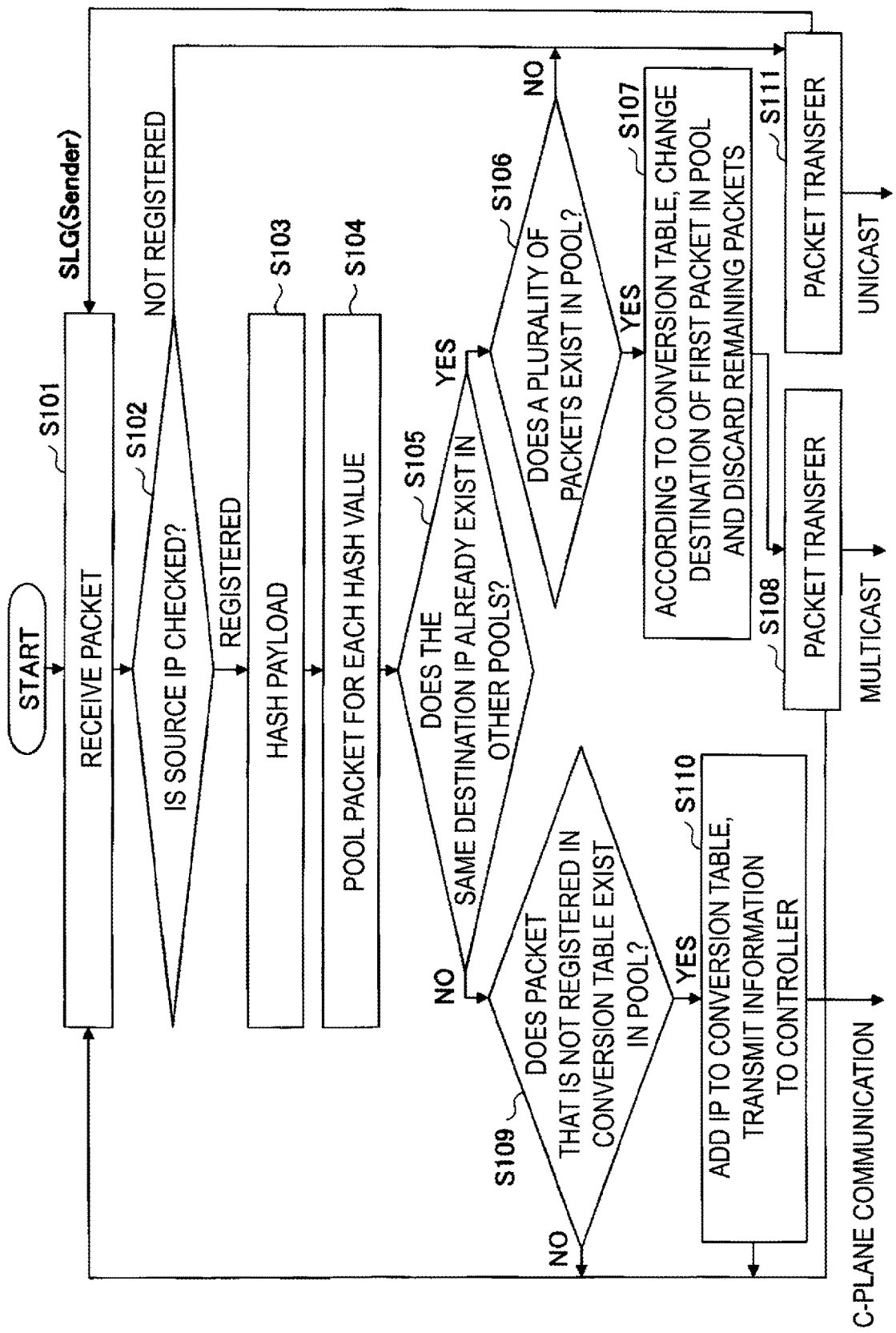
FIG. 8 is a flowchart illustrating an operation of the SLG (sender).

An operation example of the SLG (sender) 100 including the configuration in FIG. 5 will be described below with reference to the flowchart in FIG. 8.

The SLG (sender) 100 receives the packet in S101. In S102, the transmission source IP determination unit 120 checks whether the source IP address of the packet is registered. For example, when the IP address of the game server 10 is registered, the transmission source IP determination unit 120 determines whether the source of the packet is the game server 10.

When the source IP address of the packet is registered, the flowchart proceeds to S103, the hash calculation unit 130 hashes a payload of the packet, and the packet pool unit 140 pools the packet for each hash value in S104. At this point, for convenience, the pool that stores the (currently received) packet is the "pool 1".

In S105, the packet transmission determination unit 160 determines whether the packet of the same destination IP address as the destination IP address of the current packet exists already in a pool other than the pool 1.

When S105 is affirmative, the flowchart proceeds to S106. For convenience, the pool in which the same destination IP address as the destination IP address of the current packet is the "pool 2". At this point, the packet in the "pool 2" is the packet that is previously transmitted from the game server 10, and the packet in the "pool 1" is the packet that is transmitted next.

In S106, the packet is directed to the previously-transmitted packet. In S106, the packet transmission determination unit 160 determines whether a plurality of packets exist in the "pool 2". When the plurality of packets exist in the "pool 2", in S107, the destination address conversion unit 150 refers to the conversion table to change the destination of the first packet in the "pool 2", adds the identification ID, and discard the remaining packets. In S108, the destination address conversion unit 150 outputs the packet from the IF 190, and the packet is transferred in the multicast protocol.

When the source IP address of the packet is not registered in S102 and when S106 is negative, the flowchart proceeds to S111 and the packet is transferred in unicast.

When the determination in S105 is negative (when the destination IP address of the packet that is the same as the destination IP address of the received packet does not exist in a pool other than the "pool 1"), in S109, the packet transmission determination unit 160 determines whether the packet that the destination IP is not registered in the conversion table exists in the "pool 1". In other words, the packet transmission determination unit 160 determines whether the destination IP address of the packet that is stored in the "pool 1" and received in S101 is registered in the conversion table.

When the determination in S109 is negative, the flowchart returns to S101. When the determination in S109 is affirmative, the destination IP additional request transmitting unit 170 adds the destination IP address, the MC address, and the identification ID of the packet to the conversion table stored in the storage unit 180 and transmits the destination IP additional request to the controller 300 in control communication (C-plane communication). The identification ID can be determined by a pool in which the packet is stored.

Example 2

Overall Configuration

Figure 9:
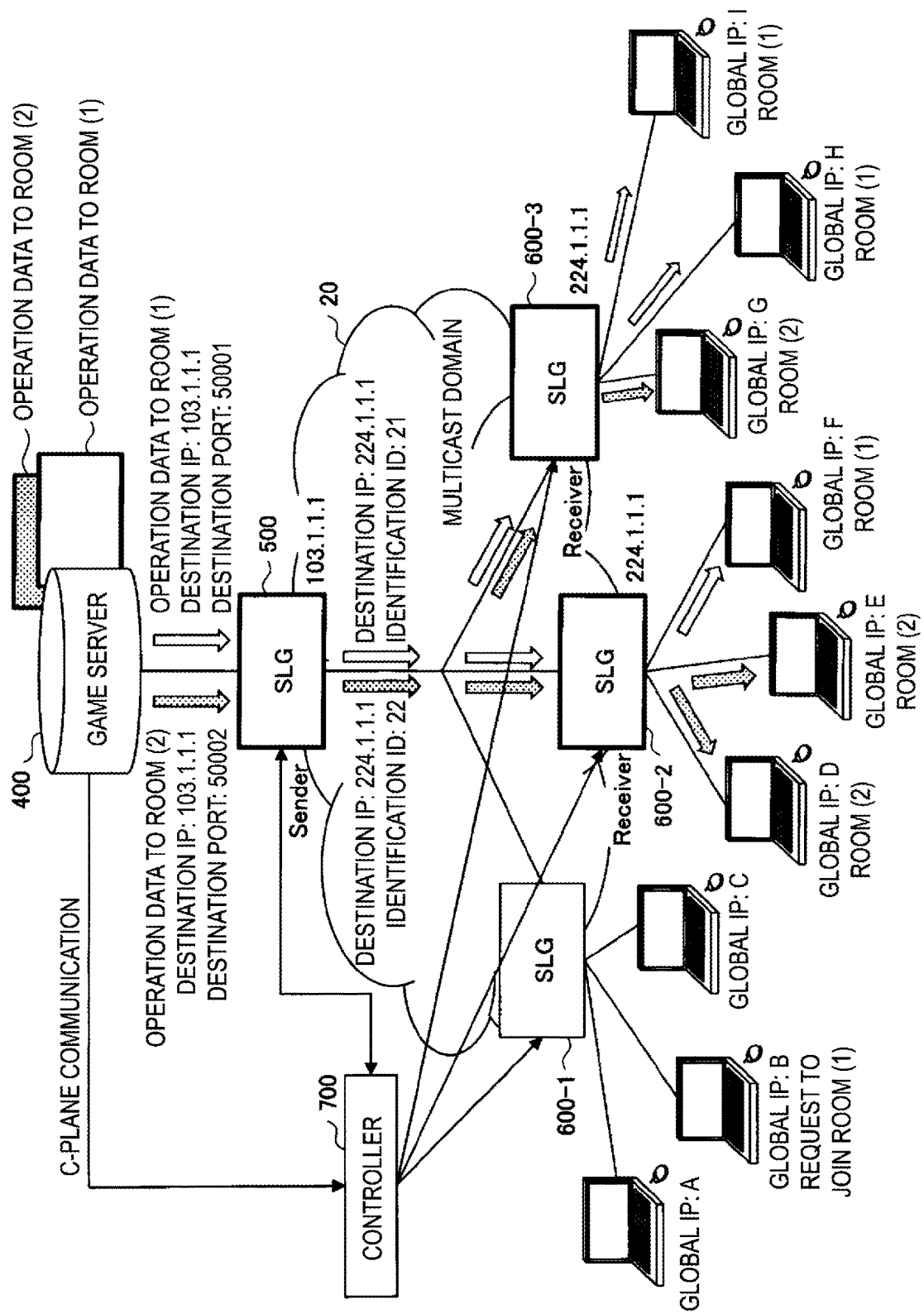
FIG. 9 is a diagram illustrating a configuration and an operation of a system according to Example 2.

FIG. 9 is a diagram illustrating the configuration and the operation of a system according to an Example 2. As illustrated in FIG. 9, the system includes a game server 400, a transmitting-side SLG (sender) 500, a receiving-side SLGs (receivers) 600-1 to 600-3, and a controller 700, and the communication can be conducted between the devices through the communication network such as the network 20 (for example, the Internet).

The SLGs (receiver) 600-1 to 600-3 are also connected to a plurality of user terminals that utilize service provided by the game server 400. A global IP address is allocated to each user terminal as illustrated in the drawing.

In Example 2, the game server 400 and the SGL are directly coordinated, and the game server 400 can transfer the data to all the user terminals of interest by simply unicast the single distributed data.

Each SLG belongs to the multicast domain and corresponds to the multicast protocol, and SLGs are the sender and the receiver in the multicast scheme. For the packet transfer between the SLGs, tunneling by VXLAN or the like is performed using the identification ID such as VLANID.

The SLG (sender) 500 converts the unicast packet received from the game server 400 into the multicast packet based on the conversion table and transmits the multicast packet to the SLG (receiver) 600 using the above tunneling. The SLG (receiver) 600 converts the multicast packet into the unicast packet based on the redistribution table and transmits the unicast packet to the user terminal of the destination.

FIG. 10 illustrates an example of the distribution table held by the game server 400. As illustrated in FIG. 10, the distribution table is a table in which the content, the destination IP address, and a destination port are associated with each other. FIG. 11 illustrates an example of a user table held by the game server 400. As illustrated in FIG. 11, the user table is a table in which the IP address (user IP) of the user terminal and the content are associated with each other.

FIG. 12 illustrates an example of a conversion table held by the SLG (sender) 500. As illustrated in FIG. 12, the conversion table is a table in which the destination port, the multicast address (MC address), and the identification ID are associated with each other. The identification ID corresponds to a room in which the user terminal joins. FIG. 12 illustrates that the identification ID=21 is added to the data in the room (1) and the identification ID=22 is added to the data in the room (2).

FIG. 13 illustrates an example of the redistribution table held by the SLG (receiver) 600-3. As illustrated in FIG. 13, similarly to Example 1, the redistribution table is a table in which the multicast address, the identification ID, and the destination IP address are associated with each other.

Operation Example

An example of the overall operation in Example 2 will be described with reference to FIG. 9. Based on the distribution table (FIG. 10) and the user table (FIG. 11), the game server 400 performs unicast transmission to a predetermined port of the IP address of the SLG (sender) 400 for each content (in this case, the operation data for each room). In the example of FIG. 9, the operation data to the room (1) is transmitted to the destination port=50001, and the operation data to the room (2) is transmitted to the destination port=50002. For example, when the operation data of the room (2) addressed to the user terminal D is generated, the game server 400 transmits the packet of operation data to the destination port=50002 in unicast based on the distribution table (FIG. 10) and the user table (FIG. 11).

The SLG (sender) 500 that receives the packet transmitted from the game server 400 acquires the MC address and the identification ID from the destination port of the received packet based on the conversion table, converts the destination of the packet into the MC address, and adds the identification ID to the packet to transmit the packet to the multicast domain.

Within the network 20 (multicast domain), the packet is transferred according to the normal multicast routing protocol.

The SLG (receiver) 600-3 will be described by way of the example with respect to the operation of the receiving-side SLG.

When receiving the packet transmitted in multicast, the SLG (receiver) 600-3 acquires the destination IP address from the redistribution table (FIG. 13) based on the destination IP address (multicast address) of the packet and the identification ID, converts the destination of the received packet from the multicast address into the destination IP address, and transmits the converted packet.

For example, when the packet that is "the multicast address=224.1.1.1, the identification ID=21" is received, the SLG (receiver) 600-3 refers to the redistribution table to transmit the packet to the user terminals of the destination IP address=H. I.

Figure 14:
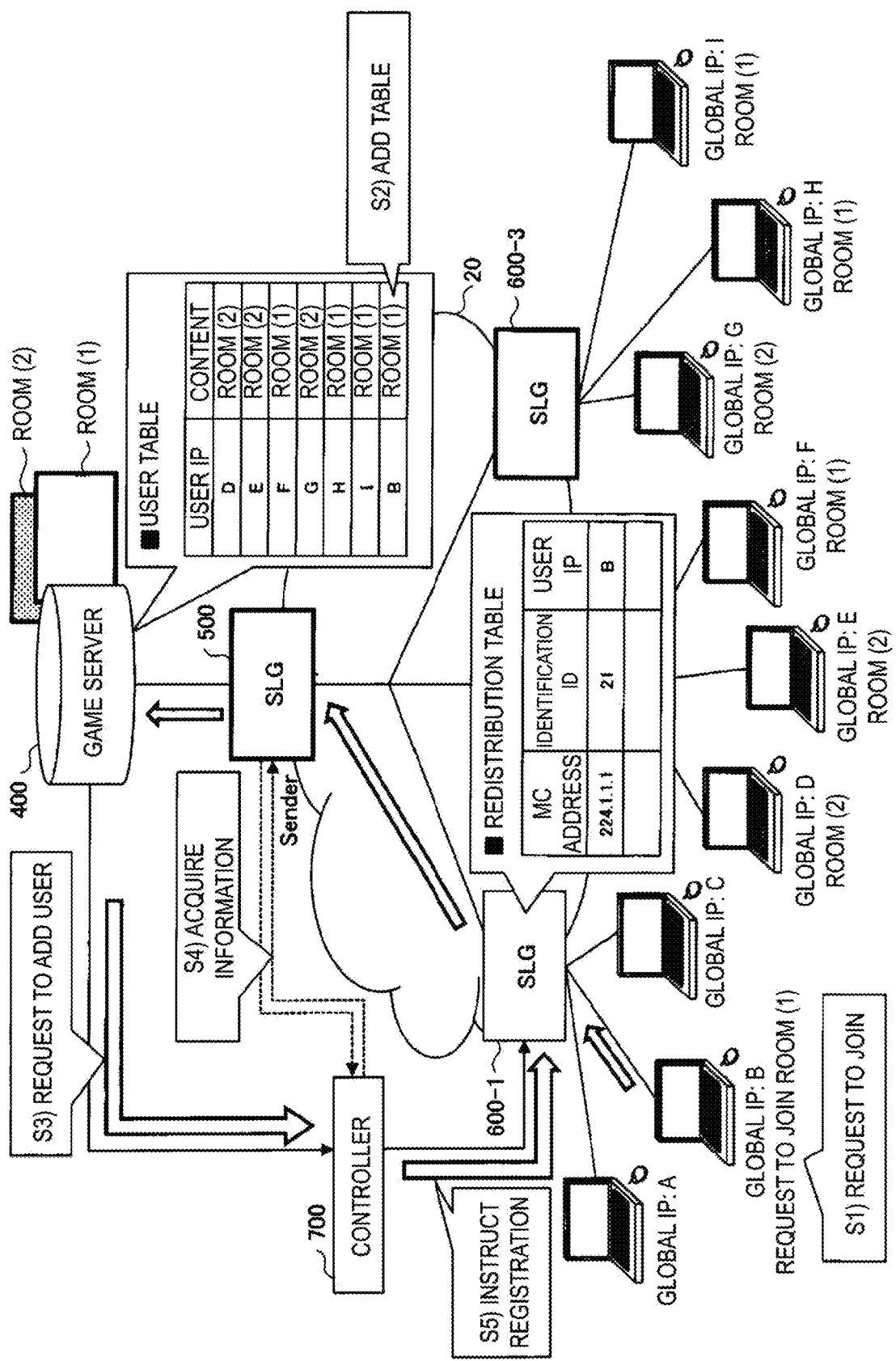
FIG. 14 is a diagram illustrating a use start flow.

The operations where the user terminal (described as "user terminal B") of the global IP address=B newly joins the room (1) will be described with reference to FIG. 14.

In S1, the user terminal B transmits a request to join the room 1 (data distribution request) to the game server 400. The packet in accordance with the request is transferred in the normal IP routing.

The game server 400 that receives the joining request adds the user to the user table in the game server 400 after approving the user concerning the user terminal B in S2. As illustrated in FIG. 14, "B, room (1)" is added. The destination port of the data to the user terminal B is 50002 by the distribution table (FIG. 10) described above.

In S3, the game server 400 requests to add the user of the controller 700 through C-plane communication. At the same time, the game server 400 also transmits corresponding records of the distribution table and the user table. Specifically, "operation data in room (1), 103.1.1.1, 50001" and "B, room (1)" are transmitted.

In S4, the controller 700 acquires the identification ID of the corresponding content from the conversion table of the SLG (sender) 500. In this case, "21" corresponding to 50001 is acquired as the identification ID.

In S5, the controller 500 instructs the registration to the redistribution table with respect to the SLG (receiver) 600-1 to which the user terminal B is connected. In the example, "224.1.1.1, 21, B" is registered as illustrated in FIG. 14. When the SLG (receiver) 600-1 itself is not joining the multicast domain, the joining instruction is made together. The joining the multicast depends on the protocol of each domain and can be made in the same manner as the case where the terminal usually joins the multicast domain. Thus, the data in the room (1) is also distributed to the user terminal B.

Comparison of Example 2 to Other Schemes

When the scheme of Example 2 is compared to the unicast scheme, the relay traffic can be reduced by the method of Example 2. Delay to each user is unified because the packet is replicated in the NW.

When the scheme of Example 2 is compared to the multicast scheme, the scheme of Example 2 eliminates the necessity for corresponding to the multicast address of the server and terminal and can be implemented by the single multicast address.

When the scheme of Example 2 is compared to the traffic conversion scheme, the scheme of Example 2 may reduce the packets transmitted by the server and reduce the load on the server.

Configuration of Device

Examples of the functional configurations of the game server 400, the SLG (sender) 500, the SLG (receiver) 600, and the controller 700 in Example 2 will be described below.

Figure 15:
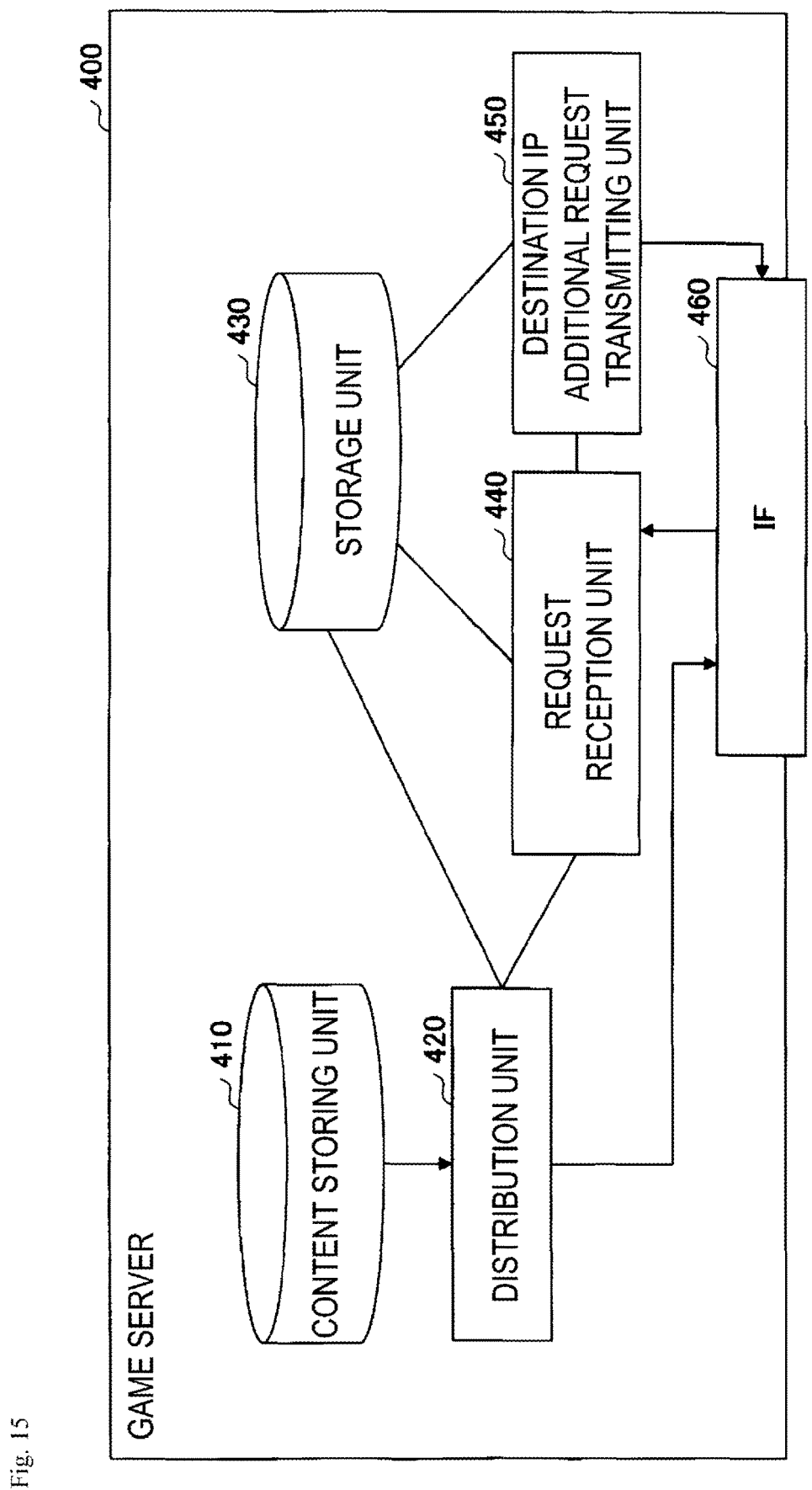
FIG. 15 is a functional configuration diagram of a game server.

FIG. 15 is a diagram illustrating an example of the functional configuration of the game server 400. As illustrated in FIG. 4, the game server 400 includes a content storing unit 410, a distribution unit 420, a storage unit 430, a request receiving unit 440, a destination IP additional request transmitting units 450, and an IF 460.

The content storing unit 410 preserves each content data. The distribution unit 420 converts the content data into the packet to transmit the packet through the IF 460. The storage unit 430 stores the distribution table and the user table. The request receiving unit 440 receives the distribution request (joining request) from the user terminal. The destination IP additional request transmitting unit 450 transmits a destination IP additional request to the controller 700. The IF 460 transmits and receives the packet.

Figure 16:
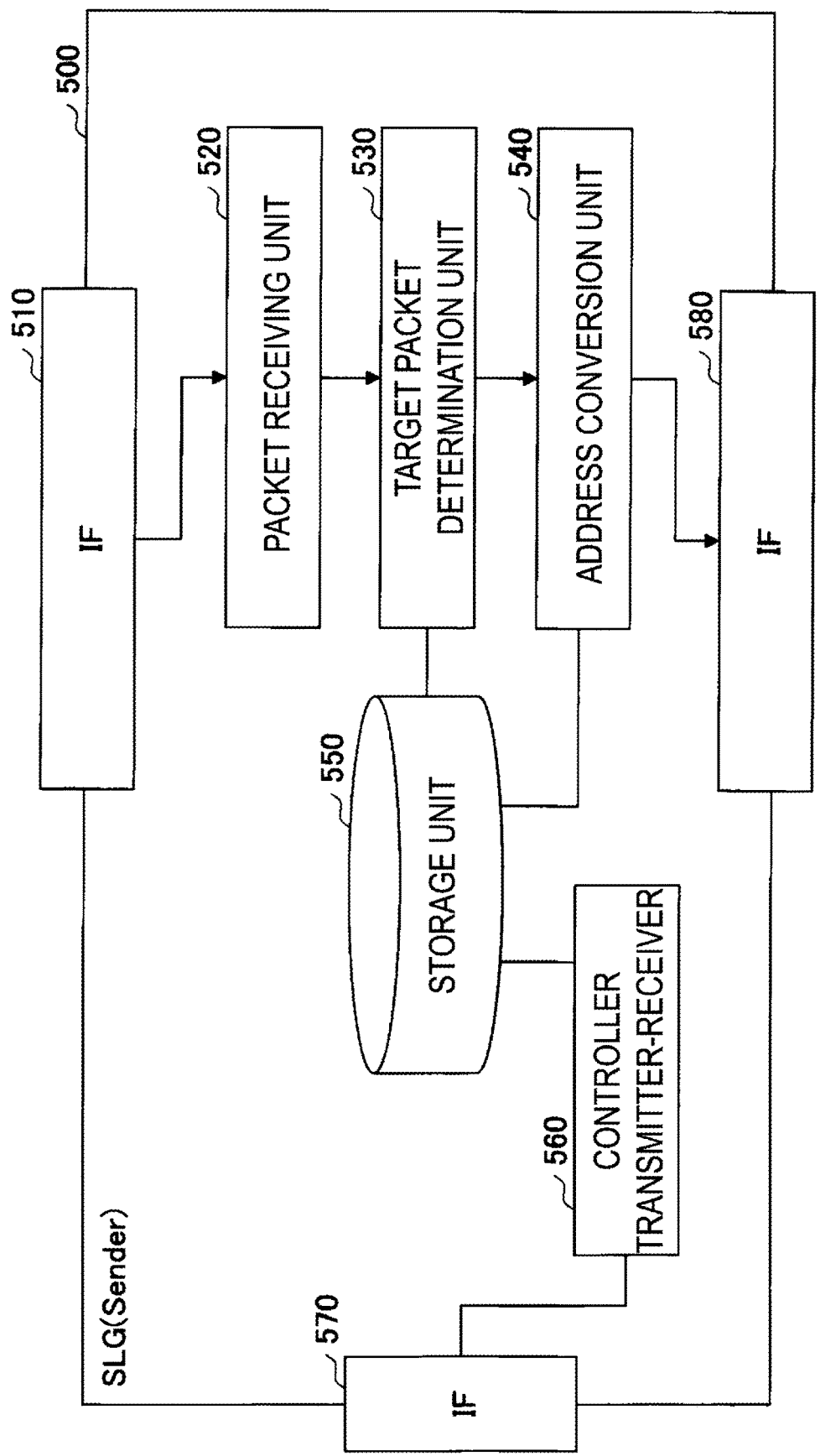
FIG. 16 is a functional configuration diagram of the SLG (sender).

FIG. 16 is a diagram illustrating an example of the functional configuration of the SLG (sender) 500. As illustrated in FIG. 16, the SLG (sender) 500 includes an IF 510, a packet receiving unit 520, a target packet determination unit 530, an address conversion unit 540, a storage unit 550, a controller transmitter-receiver 560, an IF 570, and an IF 580. The address conversion unit 540 and the IF 580 may be referred to as an address conversion unit.

The IFs 510, 570, 580 transmit and receive the packet. The packet receiving unit 520 receives the packet through the IF 510. The target packet determination unit 530 determines whether the received packet is a packet to be converted into the multicast packet.

The address conversion unit 540 converts the destination of the packet into the multicast address based on the conversion table, adds the identification ID to the packet, and transmits the address through the IF 580.

The storage unit 550 stores the conversion table. The controller transmitter-receiver 560 transmits information to the controller 700 and receives information from the controller 700.

Figure 17:
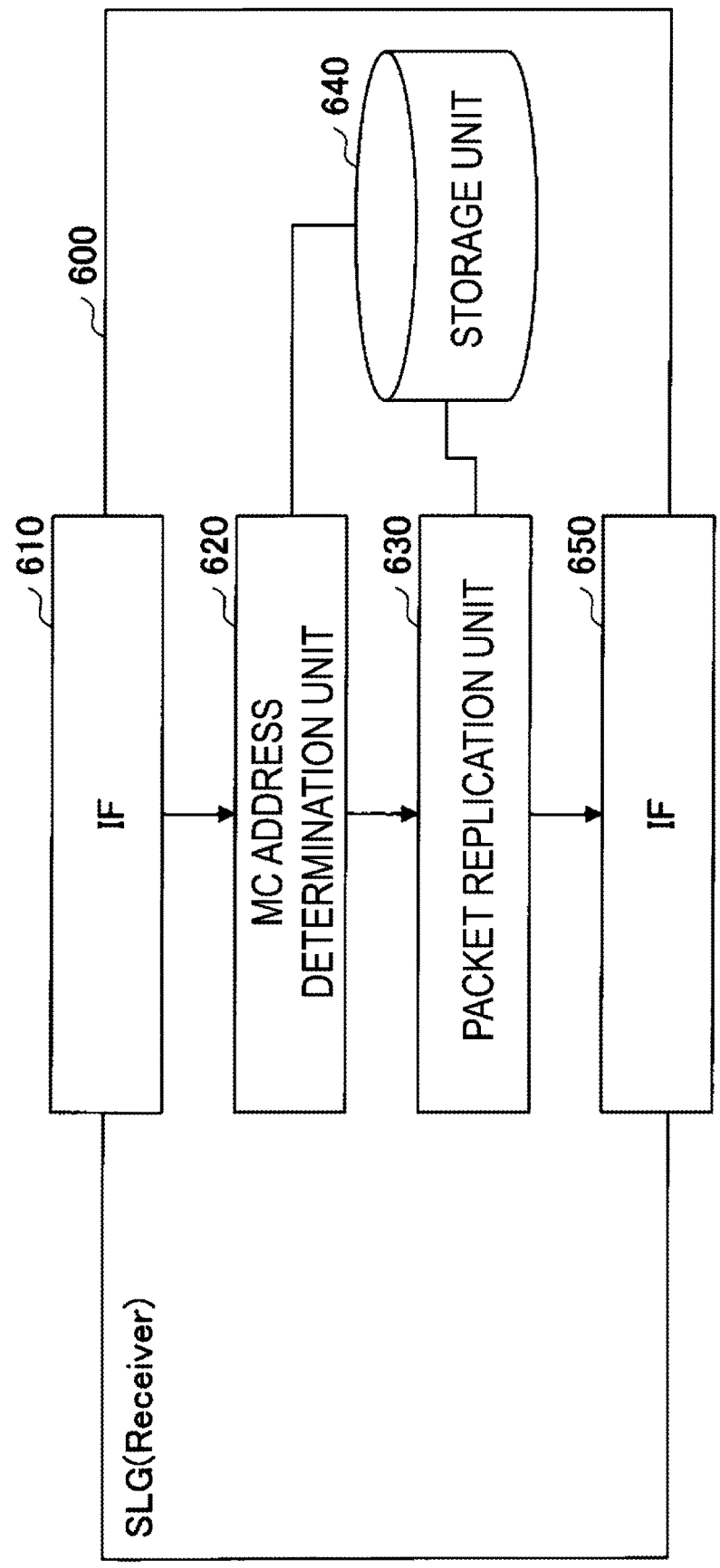
FIG. 17 is a functional configuration diagram of the SLG (receiver).

FIG. 17 is a diagram illustrating an example of the functional configuration of the SLG (receiver) 600. As illustrated in FIG. 17, the SLG (receiver) 600 comprises an IF 610, a MC address determination unit 620, a packet replication unit 630, a storage unit 640, and an IF 650.

The IF 610 receives the packet. The storage unit 640 stores the redistribution table. The MC address determination unit 620 determines whether the destination address of the received packet is the address to be converted based on the destination address and the identification ID of the received packet based on the redistribution table. Based on the redistribution table, the packet replication unit 630 replicates, as needed, the packet having the address of the conversion target, converts the destination IP address of each packet from the multicast address to the corresponding destination IP address, and transmits the corresponding destination IP address to the IF 650. The IF 650 transmits the packet. The packet replication unit 630 and the IF 650 may be referred to as a transmitting unit.

Figure 18:
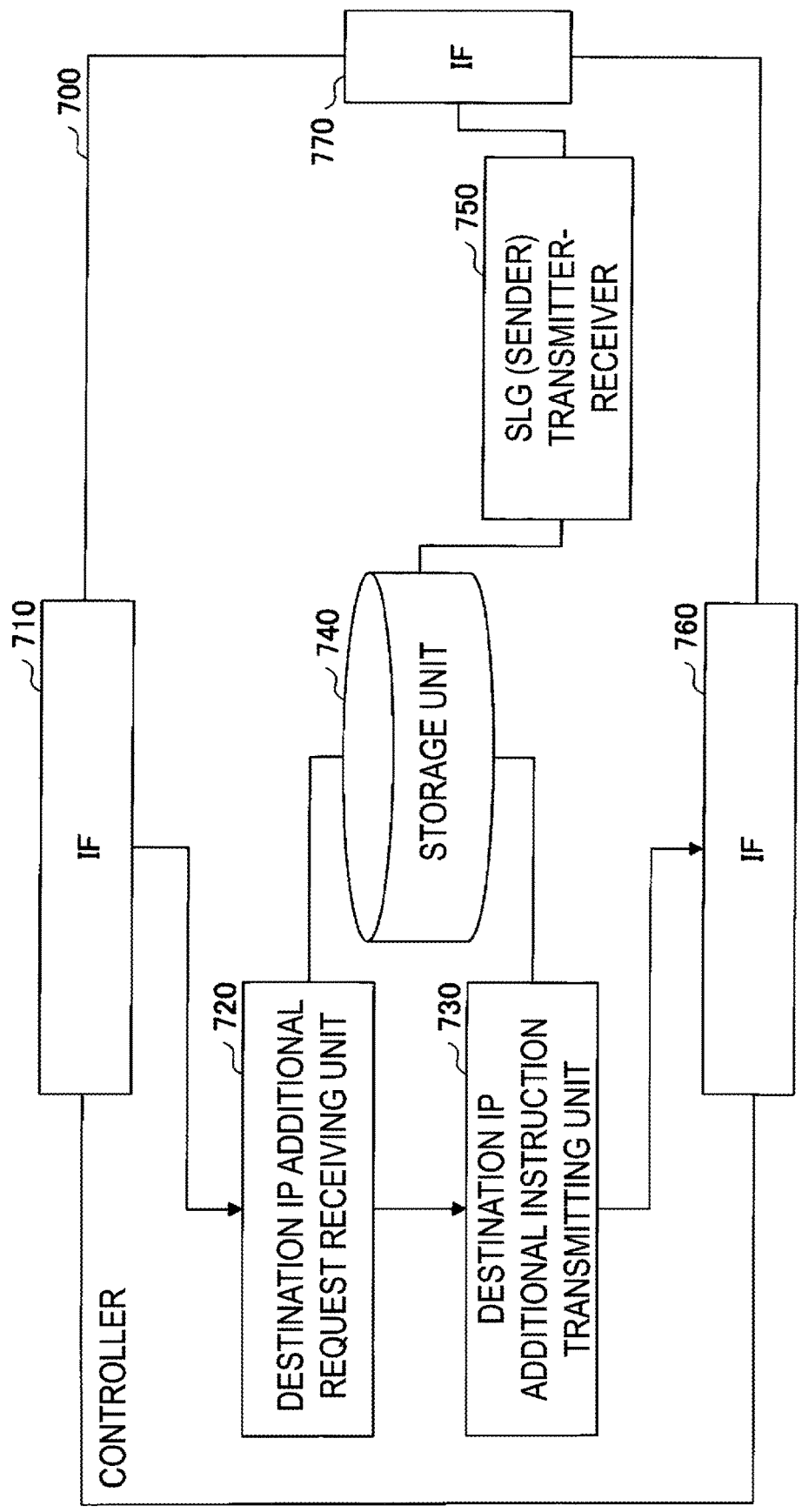
FIG. 18 is a functional configuration diagram of a controller.

FIG. 18 is a diagram illustrating an example of the functional configuration of the controller 700. As illustrated in FIG. 18, the controller 700 includes an IF 710, a destination IP additional request receiving unit 720, a destination IP additional instruction transmitting unit 730, a storage unit 740, a SLG (sender) transmitter-receiver 750, an IF 760, and an IF 770.

The IFs 710, 760, 770 transmit and receive the packet. The destination IP additional request receiving unit 720 receives the packet from the destination IP additional request transmitting unit 450 of the SLG (sender) 600 through the IF 710.

The storage unit 740 stores the IP address information about each SLG and the IP address information about the user terminal connected to a subordinate. The destination IP additional instruction transmitting unit 730 acquires the IP address of the SLG (receiving) of the destination to which the instruction is transmitted from the storage unit 740 and sends an address addition request to the destination. The destination IP additional instruction transmitting unit 730 and the IF 760 may be referred to as a transmitting unit. The SLG (sender) transmitter-receiver 750 transmits information to the SLG (sender) 500 and receives information from the SLG (sender) 500.

Example of Hardware Configuration

For example, a computer can execute a program to implement the game servers 10, 400, each SLG of Embodiments 1, 2, and the controllers 300, 700. The computer may be a physical machine or a virtual machine. The "computer" may be configured by a CPU, a memory, and the like included in a router, a switch, or the like. The SLG may be referred to as a communication device.

That is, the device (game servers 10, 400, each SLG of Embodiments 1, 2, controllers 300, 700) can be implemented by executing a program corresponding to processing executed by the device using hardware resources such as a CPU and a memory embedded in a computer. The program can be recorded on a computer-readable recording medium (a portable memory or the like) to be stored or distributed. The program can also be provided via a network such as the Internet or an e-mail.

Figure 19:
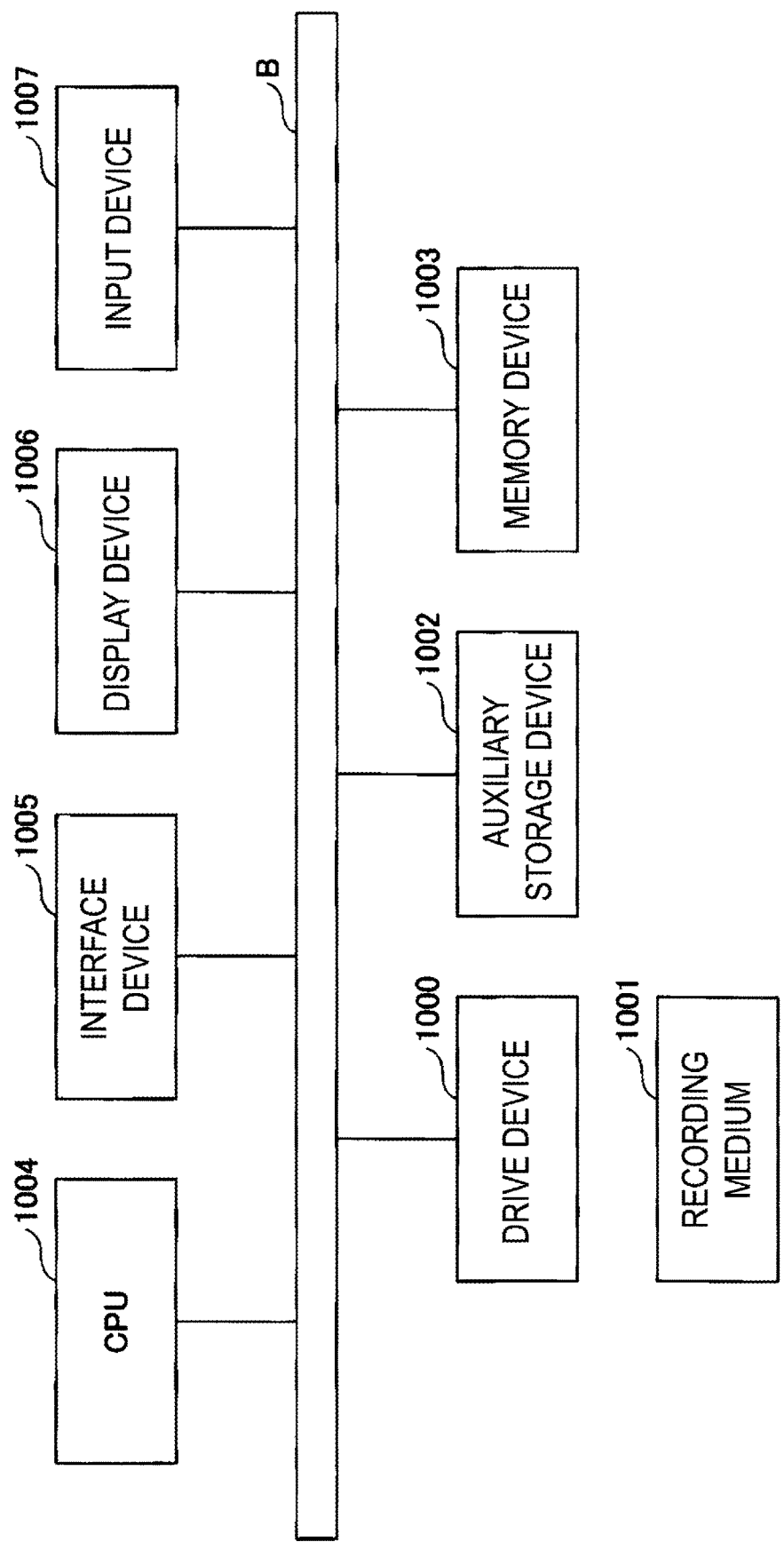
FIG. 19 is a diagram illustrating a hardware configuration example of a device.

FIG. 19 is a diagram illustrating a hardware configuration example of the above-described computer. The computer in FIG. 19 includes a drive device 1000, an auxiliary storage device 1002, a memory device 1003, a CPU 1004, an interface device 1005, a display device 1006, an input device 1007, which are connected to each other through a bus B.

A program for realizing processing in the computer is provided by, for example, a recording medium 1001 such as a CD-ROM or a memory card. When the recording medium 1001 storing the program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program when an instruction to activate the program is added. The CPU 1004 achieves functions related to the apparatus in accordance with the program stored in the memory device 1003. The interface device 1005 is used as an interface for connecting to a network and functions as an input unit and an output unit through the network. The display device 1006 displays a graphical user interface (GUI) or the like according to a program. The input device 157 is formed of a keyboard and a mouse, a button, a touch panel, or the like, and is used to allow for inputs of various operation commands.

Summary of Embodiments

The specification discloses at least the communication device, the receiving-side communication device, the communication method, and the program, which correspond to the following items.

Item 1

A communication device including:
    a storage unit that stores a conversion table;
    a receiving unit that receives a packet addressed to a user terminal from a server; and
    an address conversion unit that converts a destination address of the packet into a multicast address in accordance with the conversion table, adds, to the packet, an identification ID for identifying a group to which the user terminal belongs, and transmits the packet to which the identification ID is added.

Item 2

The communication device of first aspect further including
    a transmitting unit that transmits, when the receiving unit receives a packet addressed to a user terminal newly joining the group from the server, a registration request for requesting to register the identification ID corresponding to the group and an IP address addressed to the user terminal to the controller.

Item 3

A communication device including:
    a storage unit that stores a conversion table;
    a receiving unit that receives a packet addressed to a specific port from a server; and
    an address conversion unit that converts a destination address of the packet into a multicast address in accordance with the conversion table, adds an identification ID for identifying a group corresponding to the specific port to the packet, and transmits the packet to which the identification ID is added.

Item 4

A receiving-side communication device that receives a packet transmitted from the communication device according to any one of first to third aspects, the receiving-side communication device including
    a transmitting unit that transmits the packet having an IP address as a destination to one or more of the user terminals having the IP address corresponding to an identification ID added to the received packet.

Item 5

A controller including
    a transmitting unit configured to transmit a registration request that requests to register a multicast address, an identification ID, and a destination IP address to the receiving-side communication device according to fourth aspect.

Item 6

A communication method performed by a communication device including a storage unit that stores a conversion table, the communication method including:
    receiving a packet addressed to a user terminal from a server; and
    converting a destination address of the packet into a multicast address in accordance with the conversion table, adding an identification ID for identifying a group to which the user terminal belongs to the packet, and transmitting the packet to which the identification ID is added.

Item 7

A communication method performed by a communication device including a storage unit that stores a conversion table, the communication method including:

receiving a packet addressed to a specific port from a server; and converting a destination address of the packet into a multicast address in accordance with the conversion table, adding an identification ID for identifying a group corresponding to the specific port to the packet, and transmitting the packet to which the identification ID is added.

Item 8

A program causing a computer to operate as an individual unit in the communication device according to any one of first to third aspects.

Although the present embodiments have been described above, the present disclosure is not limited to such a specific embodiment, and various modifications and changes can be made within the scope of the gist of the present disclosure described in the claims.

REFERENCE SIGNS LIST 10, 400 Game server
20 Network
100, 200, 500, 600 SLG
300, 700 Controller
110, 190 IF
120 Transmission source IP determination unit
130 Hash calculation unit
140 Packet pool unit
150 Destination address conversion unit
160 Packet transmission determination unit
170 Destination IP additional request transmitting unit
180 Storage unit
210, 250 IF
220 MC address determination unit
230 Packet replication unit
240 Storage unit
310, 350 IF
320 Destination IP additional request receiving unit
330 Destination IP additional instruction transmitting unit
340 Storage unit
410 Content storing unit
420 Distribution unit
430 Storage unit
440 Request receiving unit
450 Destination IP additional request transmitting unit
460 IF
510, 570, 580 IF
520 Packet receiving unit
530 Target packet determination unit
540 Address conversion unit
550 Storage unit
560 Controller transmitter-receiver
610, 650 IF
620 MC address determination unit
630 Packet replication unit
640 Storage unit
710, 760, 770 IF
720 Destination IP additional request receiving unit
730 Destination IP additional instruction transmitting unit
740 Storage unit
750 SLG (sender) transmitter-receiver
1000 Drive device
1001 Recording medium
1002 Auxiliary storage device
1003 Memory device
1004 CPU
1005 Interface device
1006 Display device
1007 Input device

The invention claimed is:

1. A communication device comprising:

a storage storing a conversion table and a redistribution table; and circuitry configured to receive a packet from a server, the packet being addressed to a user terminal, calculate a hash value of the received packet, and store the packet for each hash value in a corresponding pool, perform a determination of a packet transformation and transmission based on the corresponding pool, convert a first destination address of the packet into a multicast address, by referring to the conversion table, add, to the packet, an identification ID identifying a group to which the user terminal belongs, acquire a second destination address from the redistribution table based on the multicast address and the identification ID, the second destination address being an IP address as a destination for the received packet, convert the first destination address from the multicast address into the second destination address based on the corresponding pool, and transmit the packet to which the identification ID is added based on the converted second destination address.

2. The communication device according to claim 1, wherein the circuitry is further configured to receive, from the server, a packet addressed to the user terminal upon joining a new group, transmit, to a controller, a registration request to register (i) a second identification ID corresponding to the new group and (ii) an IP address of the user terminal, in response to receiving the packet addressed to the user terminal upon joining the new group.

3. A communication device comprising:

a storage storing a conversion table and a redistribution table; and circuitry configured to receive a packet from a server, the packet being addressed to a specific port, calculate a hash value of the received packet, and store the packet for each hash value in a corresponding pool, perform a determination of a packet transformation and transmission based on the corresponding pool, convert a first destination address of the packet into a multicast address, by referring to the conversion table, add, to the packet, an identification ID identifying a group corresponding to the specific port, acquire a second destination address from the redistribution table based on the multicast address and the identification ID, the second destination address being an IP address as a destination for the received packet, convert the first destination address from the multicast address into the second destination address based on the corresponding pool, and transmit the packet to which the identification ID is added based on the converted second destination address.

4. A receiving-side communication device configured to receive the packet transmitted from the communication device according to claim 1, the receiving-side communication device comprising:

second circuitry configured to transmit, to one or more user terminals, the packet of which a destination is an IP address that corresponds to the identification ID added to the received packet, wherein the IP address is assigned to the one or more user terminals.

5. A controller comprising:

third circuitry configured to transmit a registration request to register (i) a multicast address, (ii) an identification ID, and (iii) a destination IP address, to the receiving-side communication device according to claim 4.

6. A communication method performed by a communication device including a storage that stores a conversion table and a redistribution table, the communication method comprising:

receiving a packet from a server, the packet being addressed to a user terminal;

calculating a hash value of the received packet and store the packet for each hash value in a corresponding pool;

performing a determination of a packet transformation and transmission based on the corresponding pool;

converting a first destination address of the packet into a multicast address by referring to the conversion table;

adding, to the packet, an identification ID identifying a group to which the user terminal belongs;

acquiring a second destination address from the redistribution table based on the multicast address and the identification ID, the second destination address being an IP address as a destination for the received packet;

converting the first destination address from the multicast address into the second destination address based on the corresponding pool, and transmitting the packet to which the identification ID is added based on the converted second destination address.

7. A non-transitory computer readable medium storing a program that causes a computer to execute the method of claim 6.

* * * * *